United States Patent Office 3,814,594
Patented June 4, 1974

3,814,594
BLANK MOLD SPRAY
Eustace H. Mumford, Ottawa Lake, Mich., assignor to Owens-Illinois, Inc.
Filed Nov. 17, 1972, Ser. No. 307,603
Int. Cl. C03b 39/00
U.S. Cl. 65—169     5 Claims

ABSTRACT OF THE DISCLOSURE

Automatic lubrication spray apparatus for glass forming molds which is positioned on one side of the molds for clearance from the seating of baffles and charging of glass. The spray is controlled by the nozzle size, air pressure, and lubricant concentration. The spray is delivered through a nozzle on the end of an arm positioned above the mold in coaxial alignment with the vertical axis of the mold. The arm pivots about the end opposite the nozzles and is rotated downward out of position by a rack and pinion actuated by a pneumatically operated piston with a rack on its upper end. The piston works vertically in a cylinder which is an integral part of the structure. The piston is opposed by a coil spring which holds the arm out over the mold and in position to spray whenever the pneumatic piston is not in operation. The resiliency of the spring allows the arm to move downward and out of the way if a baffle comes down out of sequence to a position of interference with the arm. The arm moves without sustaining damage which could cause costly delays.

BACKGROUND OF THE INVENTION

In the lubrication of glass forming molds, particularly parison molds, it is common practice for the operator to apply the lubricant manually, using a brush or long-handled "swab." This procedure is done at whatever frequency the operator feels is necessary to prevent sticking in the molds. No two operators carry this out in the same manner, varying in frequency of applications, amount of lubricant brushed onto the mold surface, and uniformity of application over the surface. Variation occurs even on the same shift with the same operator. In addition, some operators will alter the composition of the lubricant based on some personal belief in the merit of their own formula.

Close, consistent control of lubricant application is desired, since excessive lubricant causes losses from defects such as carbon black specks, and inadequate lubrication causes losses due to ware sticking in the molds.

DESCRIPTION OF THE PRIOR ART

Attempts have been made in the past to provide automatic spray equipment for glass forming molds, but all have had limited success because of several problems. Initially, spray heads were connected with stationary mechanisms rather than being mounted on the mold and required the forming cycle to be slowed to provide proper spraying time. Spraying from an annular arrangement of nozzles at the perimeter of the gob delivery funnel mechanism as shown in U.S. Pat. 3,141,752 has met with some success, but it has been shown to be more desirable to use a divergent spray pattern directed from the axis of the mold cavity. A mechanism to accomplish this has been used as shown in U.S. Pat. 3,623,856. While this system has met with some success, it is highly susceptible to damage from other working parts of the glass forming system if the timing sequence of the system gets out of synchronization. Most particularly, the baffle may come down out of sequence and damage the spray arm, causing costly delays and repairs. It is desirable to have a spray mechanism which cannot be damaged by such a machine timing failure.

SUMMARY OF THE INVENTION

This invention relates in general to improvements in apparatus for spraying mold lubricant into open-top glass forming molds; said apparatus being a casting mounted to one side of the mold on the mold support structure, said casting pivotally supporting an arm having a spray nozzle at its outer end, said arm being connected to a fluid motor means for swinging the arm down and out of position over the center of the molds, said motor means opposing a biasing means for holding the arm in position over the molds, yet allowing movement out of the desired position when acted upon by some outside force without inflicting damage to the arm, and means for feeding lubricant and air under pressure through a passage in said arm to said nozzle at the outer end of the arm.

BRIEF DESCRIPTION OF THE DRAWINGS

With particular reference to FIG. 1, the spray apparatus of the invention is illustrated as being mounted on one-half of a mold supporting mechanism. Molds 10, specifically illustrated here as one-piece molds, are supported by split mold holders 11 and 12, which, commonly, are pivotally connected to a pivot post 13, with the holder 12 being formed with a mounting plate portion 14 which is bolted to mold supporting arm 15. The arm 15 is supported by a vertical post or sleeve 16 which, in the particular arrangement of solid blank molds, as specifically illustrated, serves as an actuated mechanism for raising and lowering the molds 10 relative to neck molds and pressing plungers (not shown), for example, as shown in U.S. Pat. 3,024,571, wherein FIG. 6 shows a dual parison mold holder 31 supported by a hollow sleeve portion 35.

Figure 1:
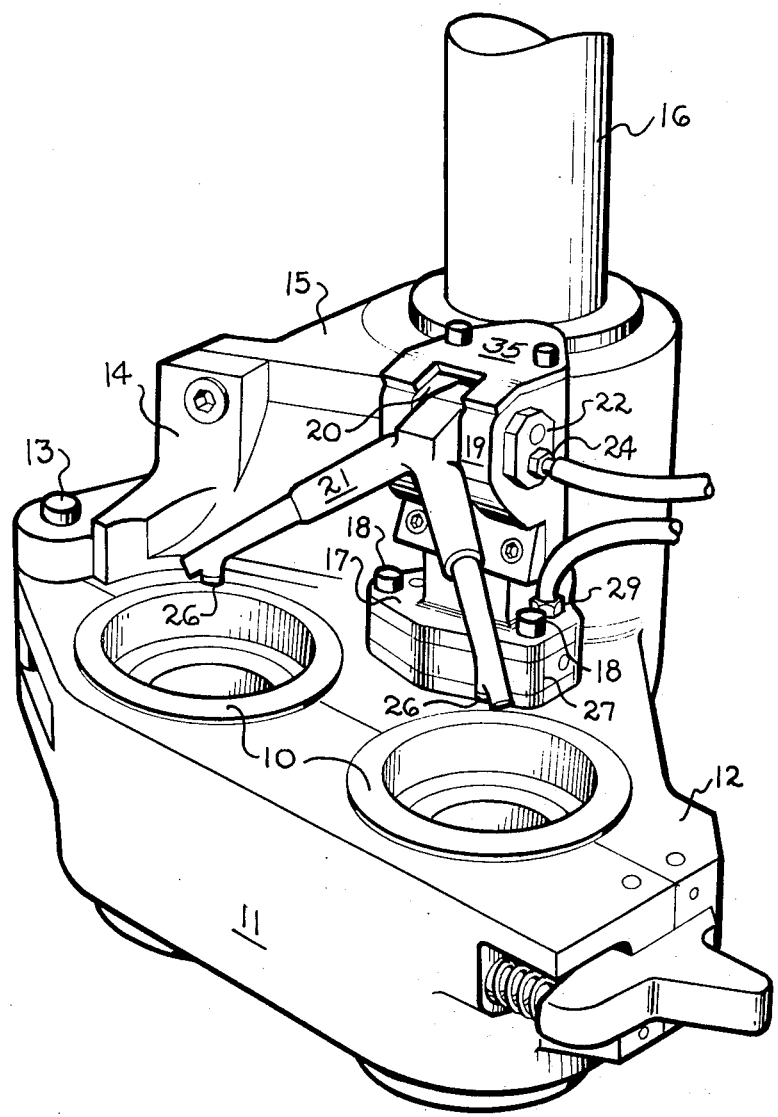
FIG. 1 is a perspective view of the mold spray equipment of the invention, mounted on a parison mold.

A casting 17 is affixed to the mold holder 12 by threaded fasteners 18, positively locating the casting 17 in relationship to the molds 10. The casting 17, toward its forward or mold facing surface 19, is formed with a slot 20. The slot 20 accommodates the base of a Y shaped arm 21, which is pivotally mounted on a nonrotating horizontal shaft 22.

Figure 3:
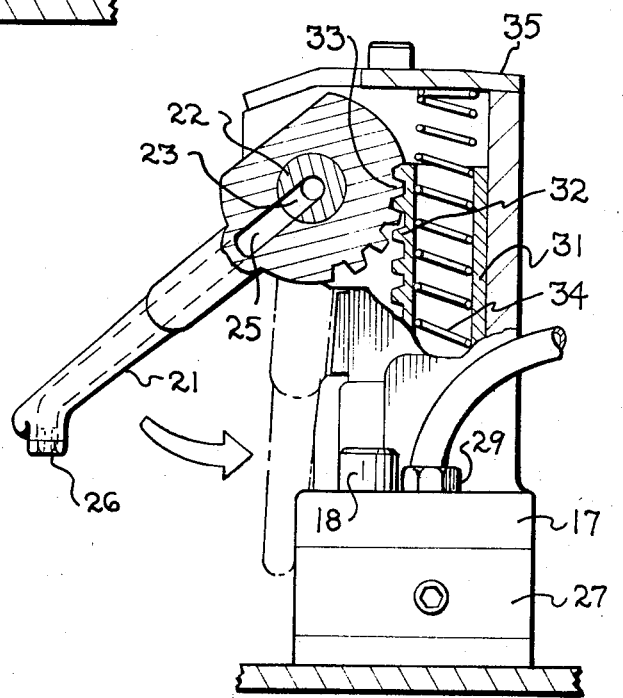
FIG. 3 is a view partly in side elevation and partly in section, illustrating the arm in both the extended and retracted positions.

The shaft 22 is drilled out axially at least to the midpoint of its length and is provided with a connecting, side opening port 24, which can be seen in FIG. 3. The non-rotating shaft 22 has a fitting 24 communicating with the passageway and hence the port 23, thus providing a means for supplying a mixture of air and lubricant to the port 23. The port 23 remains in the position shown at all times, since the shaft 22 does not rotate. The arm 21 pivots about the shaft 22 and when the arm 21 is in the extended position centrally over the axes of the molds 10, the port 23 communicates with a passageway 25 in the arm 21, which branches into two outlet passages, one in each branch of the Y shaped extensions of the arm 21, which in turn terminate in spray nozzles 26.

It should be noted that when the arm 21 is in position over the molds 10, the passageways in the shaft 22 and arm 21 communicate through the side openings port 23 and the mixture of air and lubricant may pass therethrough. Conversely, when the arm 21 is rotated out of position as shown in dot-dash line in FIG. 3, the flow of air and lubricant is stopped by the misalignment of the port 23 and the passageway 25 in the arm 21.

The casting 17 is bolted to the mold holder 12 through a support block 27 which has a passageway 28 drilled therein. The casting 17 has a fitting 29 thus providing a means for delivering compressed air. The fitting 29 connects to an opening 30 in the casting 17, which in turn communicates with the passageway 28 in the support block 27.

Figure 2:
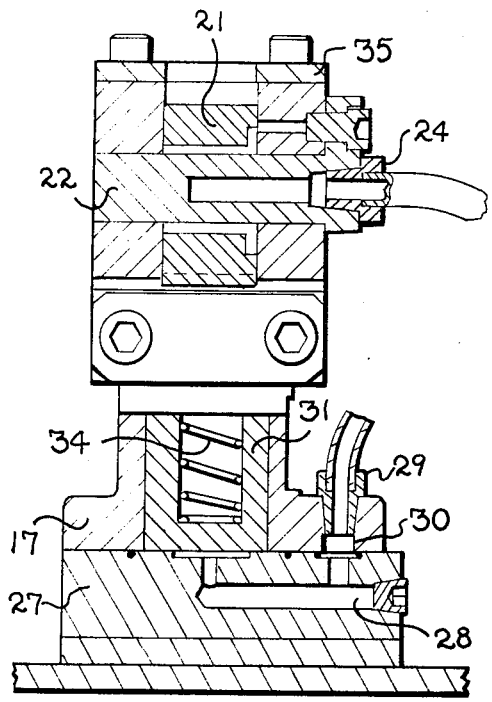
FIG. 2 is a vertical, sectional view of the spray apparatus, the section taken partly through the vertical plane containing the axis of rotation of the arm, and partly through the vertical plane containing the center line of the fluid motor shaft.

The casting 17 is formed with a vertical cylindrical opening to accommodate a piston 31. This piston 31 is moved vertically upward by compressed air delivered through passageway 28. The upper end of piston 31 takes the form of a gear rack 32. The forward-facing gear rack 32 meshes with a gear sector 33 formed in the backward facing portion of the arm 21. The gears 32 and 33 communicate such that when the piston 31 is in its down position, as shown in FIG. 2, the arm 21 is in position over the molds 10 and the air-lubricant mixture will be delivered to the molds 10. When the piston 31 is forced upwards by pressurized air delievered through passageway 28, the gears 32 and 33 communicate such that the arm 21 is pivoted down out of position as shown in FIG. 3, preventing lubricant and air from being sprayed. The piston 31 is in the form of a hollow cylinder and is fitted with a coil compression spring 34 which acts between the inside bottom surface of the piston 31 and a cover plate 35 fixed to the top of the casting 17. When air pressure is applied to the bottom of the piston 31 through the passageway 28, the spring 34 is compressed as the piston 31 moves upward and the arm 21, in turn, rotates downward. When the air pressure is released, the spring 34 returns the piston 31 to its original position.

It should be noted that if an external force should come in contact with the arm 21, such as a machine baffle coming into position out of synchronization or upon failure of the retracting pressure when the baffle is operating with proper synchronization, the arm 21 would move relatively freely downward and out of position without damage thereto, considering the force exerted by the spring 34 as being fairly light. This feature is very important since in the operation of the mechanism, the spray is introduced to the interior of the mold 10 at a point in time just prior to the feeding of a gob of molten glass into the mold. At the time the charge is fed into the mold, the spray arm 21 must be out of the way as in subsequent forming operations with respect to the charge of glass. The arm 21 will remain in its retracted position until the air pressure is released. However, if the machinetiming causes the pressure to drop and the arm 21 swings out while other operations are in progress, or if a baffle comes down while the arm is out over the mold, the arm will be brushed downward and not damaged.

While the foregoing detailed description has been directed to the operation of a pivotal spray system in which the spray arms are moved into and held in spraying position by the action of a compression spring, it should be kept in mind that this spring could be replaced by a continuously pressurized fluid motor acting as a fluid spring. Retraction and holding of the arm in retracted position would then be accomplished by the operation of an opposing fluid motor having sufficient force to overcome the biasing of the first fluid motor.

I claim:

1. Apparatus for spraying mold lubricant into open-topped glass forming molds, wherein said molds are connected to a mold holder at one side of said molds, comprising:
   (a) a casting;
   (b) means mounting said casting adjacent to the open top of said molds;
   (c) said casting having a horizontally extending bifurcated upper portion facing in the direction of said molds;
   (d) a horizontal non-rotating shaft extending between the bifurcations of the upper portion of said casting;
   (e) said shaft having a passage extending therethrough and a side opening formed therein adjacent the midpoint of its length;
   (f) arm means mounted on said shaft said arm means is formed with a gear sector in its backward facing portion, for pivoting motion in a vertical plane about the axis of said shaft, said arm means having a passageway extending therethrough;
   (g) a spray nozzle communicating with said passageway of said arm means and mounted on one end of said arm means;
   (h) the side opening in said passage in said shaft communicating with the passageway in said arm means when said arm means is in position with said spray nozzle centrally positioned over the opening in the mold;
   (i) said casing having a vertically extending cylindrical opening formed therein;
   (j) fluid motor means formed in the lower end of said vertically extending cylinder and engaging said arm means to pivot said arm means downward and away from a central position over the molds said fluid motor means in a piston with a gear rack formed in its upper portion communicating with said gear sector in said arm;
   (k) means biasing said arm in the central position over said mold;
   (l) means in said casting to deliver pressurized fluid to said fluid motor means;
   (m) and means for feeding lubricant and air under pressure to the passage in said non-rotating shaft.

2. The apparatus of claim 1, wherein said biasing means is a vertically extending coil spring.

3. The apparatus of claim 1, wherein said arm is in the form of a Y with the base of the Y pivotally supported by said non-rotating shaft, nozzle means carried by both the extending ends of said arm and said passage in said arm extending from the base thereof into both branches of the Y to the nozzles carried thereby.

4. An apparatus for spraying mold lubricant into open-topped glass forming molds, wherein the spray apparatus is positioned adjacent the molds and wherein spray heads, equal in number to the number of cavities in the molds, are carried on arms pivoted about a horizontal axis into and out of alignment with the vertical axes of the cavities, the improvement comprising biasing means for urging said arms and spray heads upwardly from a substantially vertical retracted position into alignment with the vertical axes of the mold activities and means opposing said biasing means for moving the arms and spray heads into the retracted position further including gear means carried by said arms and wherein said means opposing comprises a fluid actuated rack in engagement with said gear means.

5. The apparatus of claim 4, wherein said biasing means comprises a compression spring.

References Cited
UNITED STATES PATENTS 3,623,856  11/1971  Keller _____ 65—169
 779,089   1/1905  Main _____ 65—311 X S. LEON BASHORE, Primary Examiner R. PACE, Assistant Examiner U.S. Cl. X.R.
65—24, 26, 170